(12) United States Patent
Chang

(10) Patent No.: US 10,565,168 B2
(45) Date of Patent: Feb. 18, 2020

(54) INDEPENDENT SYNCHRONIZATION WITH STATE TRANSFORMATION

(71) Applicant: Oxygen Cloud, Inc., Cupertino, CA (US)

(72) Inventor: Peter C. Chang, Cupertino, CA (US)

(73) Assignee: OXYGEN CLOUD, INC., Cupertino, CA (US)

(*) Notice: Subject to any disclaimer, the term of this patent is extended or adjusted under 35 U.S.C. 154(b) by 290 days.

(21) Appl. No.: 15/585,065

(22) Filed: May 2, 2017

(65) Prior Publication Data

US 2018/0322138 A1 Nov. 8, 2018

(51) Int. Cl.
*G06F 16/00* (2019.01)
*G06F 16/178* (2019.01)
*G06F 16/17* (2019.01)
*H04L 29/08* (2006.01)

(52) U.S. Cl.
CPC ........ *G06F 16/178* (2019.01); *G06F 16/1727* (2019.01); *H04L 67/1097* (2013.01)

(58) Field of Classification Search
CPC ............... G06F 16/178; G06F 21/6209; G06F 16/1727; G06F 17/30179; G06F 16/00; G06F 16/192; G06F 16/219; G06F 21/602; G06F 17/3023; G06F 17/30; H04N 1/32144; H04N 21/8358; H04L 67/1095; H04L 67/06; H04L 67/1097; H04L 67/42; H04W 28/02
See application file for complete search history.

(56) References Cited

U.S. PATENT DOCUMENTS

| | | | |
|---|---|---|---|
| 5,276,867 A | | 1/1994 | Kenley et al. |
| 5,333,299 A | * | 7/1994 | Koval .................. G06F 16/40 713/400 |
| 5,623,681 A | | 4/1997 | Rivette et al. |

(Continued)

FOREIGN PATENT DOCUMENTS

| | | |
|---|---|---|
| WO | 96/18941 A2 | 6/1996 |
| WO | 97/18519 A1 | 5/1997 |

(Continued)

OTHER PUBLICATIONS

Advisory Action for U.S. Appl. No. 13/284,485, dated Oct. 31, 2014, 3 pages.

(Continued)

*Primary Examiner* — Anh Ly
(74) *Attorney, Agent, or Firm* — Kilpatrick Townsend & Stockton LLP

(57) ABSTRACT

Synchronization techniques with state transformation are described. The synchronization techniques may include storing a data object and metadata associated with the data object at a computing device. The data object can be stored in a first representative state at the computing device. The techniques may further involve receiving user input to synchronize the data object into a second representative state at a remote computing device, automatically transforming the data object from the first representative state into the second representative state, and synchronizing the data object to a remote data object stored at the remote computing device. The remote data object can be stored in the second representative state at the remote computing device.

22 Claims, 9 Drawing Sheets

(56) References Cited

U.S. PATENT DOCUMENTS

| | | | |
|---|---|---|---|
| 5,872,969 A * | 2/1999 | Copeland | G06F 12/0815 |
| | | | 711/E12.026 |
| 6,324,544 B1 | 11/2001 | Alam et al. | |
| 6,466,951 B1 | 10/2002 | Birkler et al. | |
| 6,725,268 B1 | 4/2004 | Jackel et al. | |
| 8,903,893 B2 * | 12/2014 | Griffith | H04L 43/10 |
| | | | 709/203 |
| 8,965,847 B1 * | 2/2015 | Chang | G06F 16/192 |
| | | | 707/621 |
| 2002/0069399 A1 * | 6/2002 | Miloushey | G06F 8/36 |
| | | | 717/108 |
| 2003/0174155 A1 | 9/2003 | Weng et al. | |
| 2003/0182327 A1 | 9/2003 | Ramanujam et al. | |
| 2004/0172423 A1 | 9/2004 | Kaasten et al. | |
| 2004/0250034 A1 | 12/2004 | Yagawa et al. | |
| 2005/0015662 A1 | 1/2005 | Scanlan | |
| 2005/0033561 A1 | 2/2005 | Orofino | |
| 2005/0060741 A1 | 3/2005 | Tsutsui et al. | |
| 2005/0192973 A1 * | 9/2005 | Sperling | G06F 16/273 |
| | | | 707/E17.005 |
| 2005/0262192 A1 * | 11/2005 | Mamou | G06F 16/254 |
| | | | 709/203 |
| 2006/0069809 A1 | 3/2006 | Serlet | |
| 2006/0190500 A1 | 8/2006 | Rao et al. | |
| 2006/0190506 A1 | 8/2006 | Rao et al. | |
| 2006/0206533 A1 * | 9/2006 | MacLaurin | G06F 16/10 |
| | | | 707/E17.01 |
| 2006/0248232 A1 | 11/2006 | Chasman et al. | |
| 2006/0253485 A1 | 11/2006 | Bangel et al. | |
| 2007/0088754 A1 | 4/2007 | Brannon et al. | |
| 2007/0112890 A1 | 5/2007 | Murase | |
| 2007/0143324 A1 | 6/2007 | Eichhorst et al. | |
| 2007/0179995 A1 * | 8/2007 | Prahlad | G06F 16/24575 |
| | | | 707/E17.143 |
| 2007/0276836 A1 * | 11/2007 | Chatterjee | G06F 16/182 |
| | | | 707/E17.005 |
| 2008/0005184 A1 | 1/2008 | Myllyla et al. | |
| 2008/0091669 A1 | 4/2008 | Anderson et al. | |
| 2008/0162577 A1 | 7/2008 | Fukuda et al. | |
| 2009/0077091 A1 * | 3/2009 | Khen | G06F 8/20 |
| | | | 707/E17.001 |
| 2009/0112880 A1 | 4/2009 | Oliveira et al. | |
| 2009/0172014 A1 * | 7/2009 | Huetter | G06F 16/2477 |
| | | | 707/E17.055 |
| 2009/0210631 A1 * | 8/2009 | Bosworth | G06F 12/0875 |
| | | | 711/141 |
| 2009/0216815 A1 | 8/2009 | Braginsky et al. | |
| 2011/0055765 A1 | 3/2011 | Neubrand et al. | |
| 2011/0096955 A1 * | 4/2011 | Voloshynovskiy | G06K 9/00 |
| | | | 382/103 |
| 2011/0131664 A1 | 6/2011 | Jonsson et al. | |
| 2011/0270855 A1 * | 11/2011 | Antonysamy | G06F 16/1794 |
| | | | 707/756 |
| 2011/0311051 A1 * | 12/2011 | Resch | H04L 63/06 |
| | | | 380/270 |
| 2011/0314035 A1 | 12/2011 | Brunet et al. | |
| 2012/0177067 A1 | 7/2012 | Cho et al. | |
| 2013/0114744 A1 * | 5/2013 | Mutton | H04N 19/40 |
| | | | 375/240.26 |
| 2013/0191831 A1 * | 7/2013 | Goyal | G06F 9/46 |
| | | | 718/100 |
| 2014/0201144 A1 * | 7/2014 | Vibhor | H04L 29/0854 |
| | | | 707/634 |
| 2014/0289191 A1 * | 9/2014 | Chan | G06F 9/54 |
| | | | 707/610 |
| 2016/0110440 A1 * | 4/2016 | May | G06F 11/1443 |
| | | | 707/625 |
| 2017/0198518 A1 * | 7/2017 | Caillet | C03C 17/36 |

FOREIGN PATENT DOCUMENTS

| | | |
|---|---|---|
| WO | 2009/015049 A2 | 1/2009 |
| WO | 2009/134548 A2 | 11/2009 |

OTHER PUBLICATIONS

Final Office Action for U.S. Appl. No. 13/284,485, dated Sep. 20, 2013, 20 pages.

Final Office Action for U.S. Appl. No. 13/284,485, dated Jul. 11, 2014, 28 pages.

Non-Final Office Action for U.S. Appl. No. 13/284,485, dated Feb. 27, 2014, 26 pages.

Notice of Allowance for U.S. Appl. No. 13/284,485, dated Dec. 23, 2014, 10 pages.

Office Action for U.S. Appl. No. 13/284,485, dated Mar. 1, 2013, 14 Pages.

Non-Final Office Action for U.S. Appl. No. 14/596,198, dated Jun. 7, 2016, 23 pages.

Non-Final Office Action U.S. Appl. No. 14/596,198, dated Nov. 17, 2016, 24 pages.

Lindholm et al., "Syxaw: Data synchronization middleware for the mobile web", Mobile Network Application, 2009, pp. 661-676.

Ordonez et al., "Metadata management for federated databases", Proceedings of the ACM first workshop on Cyberinfrastructure, 2007, pp. 31-38.

* cited by examiner

INDEPENDENT SYNCHRONIZATION WITH STATE TRANSFORMATION

BACKGROUND

File hosting or cloud storage services provide users with the ability to upload local files to a networked remote storage system for file backup and sharing. Such services allow users to view or access uploaded files from different devices, and may allow different users to access and modify the same uploaded file in a collaborative environment. While such services make it convenient for users to backup and share files, current file hosting or cloud storage services also have various deficiencies.

For instance, how a file is uploaded to and stored at the remote storage system is typically fixed by the service provider. The local and remote representative states of a file are tightly coupled such that a file can only be uploaded to the networked remote storage system in the same format as the local file, and the user has no flexibility to decouple the local and cloud representations of the file. This undesirably imposes restrictions on every device that is given access to the file to have the capabilities to consume the file format as stored at the remote storage system. As such, a device that may lack the proper capabilities (e.g., a proper application) would not be able to consume the file.

Further, with the tight coupling of the local and remote representative states, conventional systems cannot take into account the different computing environments of devices that may access and store the file. For example, if the device accessing a file is a public computer, it may be desirable to store the file in an encrypted state on the public computer, whereas if the device accessing the file is a personal device, it may be unnecessary to encrypt the file. As another example, if a device accessing a file does not have sufficient capacity to store the file, it may be desirable to compress the file before storing the file at the device. Conventional systems do not provide a user with the flexibility to arbitrarily select different representative states of a file for local and remote storage.

Embodiments of the present invention can address these and other problems individually and collectively.

BRIEF SUMMARY OF THE INVENTION

According to some embodiments, a computer-implemented method for synchronization of a data object may include storing a data object and metadata associated with the data object at a computing device, the data object being stored in a first representative state at the computing device. The method may further include receiving user input to synchronize the data object into a second representative state at a remote computing device, automatically transforming the data object from the first representative state into the second representative state, and synchronizing the data object to a remote data object stored at the remote computing device, the remote data object being stored in the second representative state at the remote computing device. The method may also include receiving an unsynchronization request to unsynchronize the data object at the computing device, removing the data object from the computing device, and maintaining the metadata associated with the data object at the computing device.

According to some embodiments, a computing device may include a processor and a memory storing executable code, which when executed by the processor, implements the method for synchronization of a data object described above.

DETAILED DESCRIPTION

Figure 1:
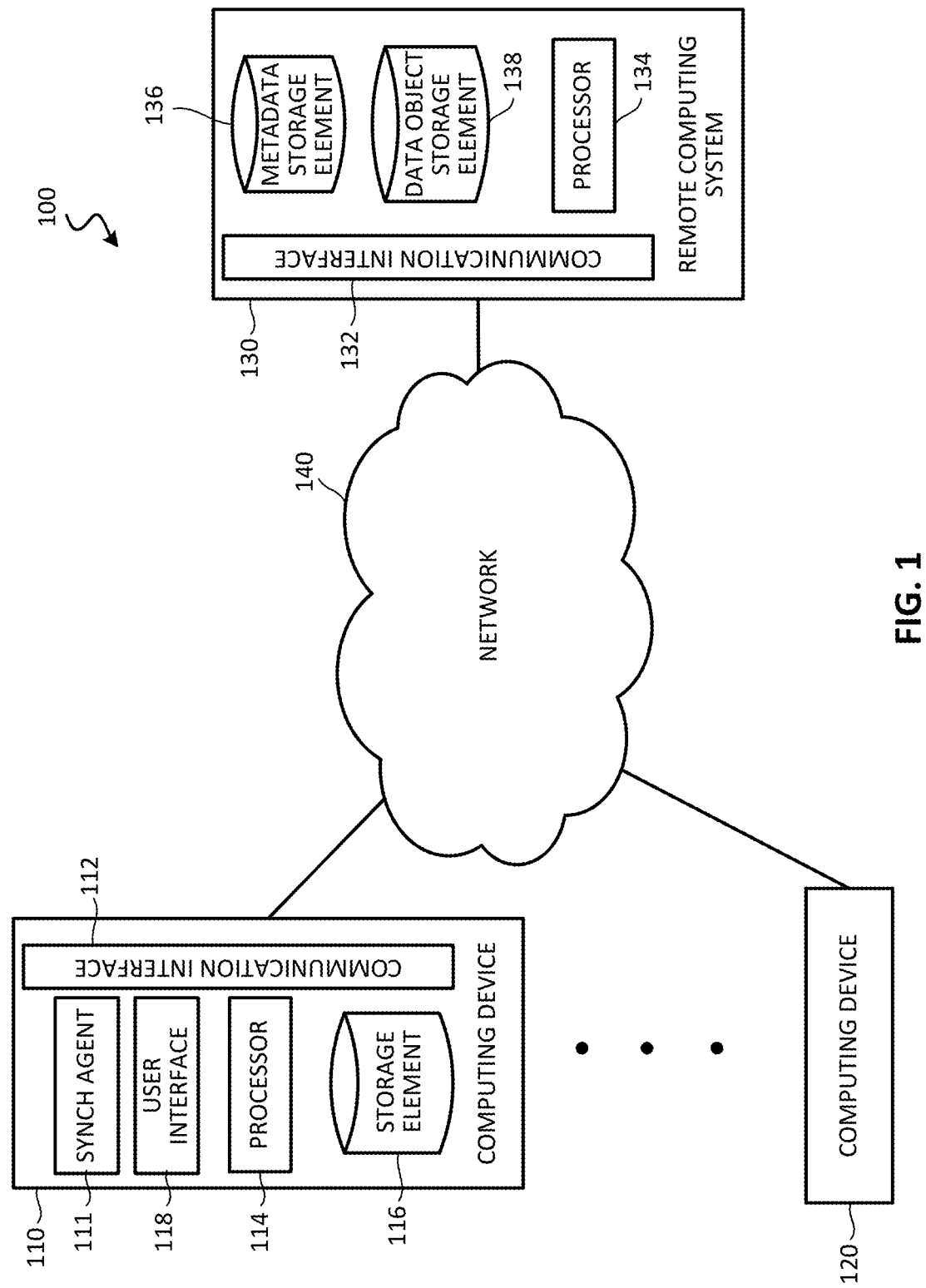
FIG. 1 illustrates a system implementing synchronization techniques, according to some embodiments.

Embodiments of the present invention provide techniques for synchronizing data objects such as files over a network. More specifically, the data objects can be synchronized into different representative states across different computing devices to improve the usability, accessibility, and security of the underlying data content. A local file at a user's computing device can be stored in a form suitable for the user's computing environment, and the file can be synchronized into a remote file at a remote computing device in another form suitable for the remote computing environment. Despite being stored in different forms or representative states, changes and manipulations made to the data content of the local file can be reflected and synchronized to the remote file. When not in use, the local file can be unsynchronized to free up memory space at the user's computing device. When needed, the file can be resynchronized from the remote computing device back to the user's computing device, and the local file can be restored at the user's computing device in the same or different form as previously used. Furthermore, the form or the representative state of how a data object is stored at one computing device can be independently configurable and be transformed from one representative state into another without affecting how the data object is stored at another computing device. Thus, not only can a local file be initially synchronized into a different representative state at a remote computing device, the representative state of the file at each computing device can be dynamically transformed into another representative state to adapt to the changing environment of the corresponding computing device or storage requirements of the file.

By way of example, a large data object such as a high-definition video file may exceed the size limit imposed by a service provider for uploading to a remote storage system. Nevertheless, in accordance with the techniques described herein, the large video file can be automatically split up into multiple files, and the large video file can be uploaded as a set of smaller files that individually satisfy the service provider's file size requirement. The video file can be stored and represented at the remote storage system as a folder containing the smaller files. As the user edits the local video file at the user's computing device, the changes can be synchronized to the smaller files contained in the folder at the remote storage system. If the changes made to video file include the addition of confidential material, the representative state of the video file at the remote storage location can be dynamically transformed into a more secure representative state. For example, the folder representing the video file at the remote storage system can be dynamically transformed into an encrypted folder to protect the content of updated video file. In this manner, the representative state of the file can be adjusted to provide the proper security protection for the added content. This is just one of many examples of the flexibility and adaptability provided by the synchronization techniques described herein.

FIG. 1 illustrates a system 100 implementing the synchronization techniques described herein, according to some embodiments. System 100 may include one or more computing devices 110-120 connected to a remote computing system 130 via a network 140. Any of computing devices 110-120 can be a client computing device such as a personal computer, an internet of things (IOT) device, a portable computing device (e.g., a mobile phone such as smart phone, a notepad computer, a tablet, a wearable device, etc.), or other electronic device with wired or wireless communication capabilities. One or more of computing devices 110-120 can be a local computing device associated with an end user, and be operated by the user to access and/or manipulate files stored on local computing device and/or remote computing system 130.

Computing device 110 may include a communication interface 112, a processor 114, a computer readable storage element 116, and a user interface 118. Communication interface 112 may include wired and/or wireless network components such as a network interface card and/or wireless transceiver to enable communication between computing device 110 and other elements of system 100, such as remote computing system 130. Processor 114 may include one or more microprocessors operable to execute instructions that cause computing device 110 to perform various operations. For example, processor 114 may execute software code (e.g., stored in storage element 116) to implement the synchronization techniques described herein. Storage element 116 may store local data objects and metadata associated with the data objects, and may include one or more of random access memory (RAM), read-only memory (ROM), flash memory, electrically-erasable programmable read-only memory (EEPROM), a hard disk, an optical disk, etc., or combinations thereof. User interface 118 may include one or more elements for receiving input from a user and providing outputs to the user. For example, user interface 118 may include a keypad, a display, a touch screen, etc., or a combination thereof.

According to some embodiments, computing device 110 may include a synchronization application 111 to facilitate management of data objects for synchronization to remote computing system 130. Synchronization application 111 can be an application or a plugin associated with a file hosting or cloud storage service provider. In some embodiments, synchronization application 111 can be downloaded to computing device 110 and stored in storage element 116 when a user enrolls or subscribes to the file hosting or cloud storage service. Synchronization application 111 provides connectivity to remote computing system 130 to allow a user to upload data objects and metadata associated with the data objects to remote computing system 130 and access the data objects and metadata therefrom. Synchronization application 111 may also provide a set of configurable options to manage how the data objects are stored and synchronized between computing device 110 and remote computing system 130, and to manage the communications between computing device 110 and remote computing system 130 (e.g., by setting download/upload speeds, bandwidth throttling options, etc.).

Remote computing system 130 may include a networked computing device (e.g., a server) operable to store and disseminate data objects (e.g., files) and metadata associated with the data objects. In some embodiments, remote computing system 130 can be implemented as a system of networked computing devices, and can operate as a cloud storage to provide distributed storage of data objects on the networked computing devices. Remote computing system 130 may include a communication interface 132, a processor 134, a non-transitory computer readable metadata storage element 136, and a non-transitory computer readable data object storage element 138. Communication interface 132 may include wired and/or wireless network components such as a network interface card and/or wireless transceiver to enable communication between remote computing system 130 and other elements of system 100, such as computing system 110-120. Processor 134 may include one or more microprocessors operable to execute instructions that cause remote computing system 130 to perform various operations including the synchronization techniques described herein.

Data object storage element 138 can be used to store data objects uploaded by users, and metadata storage element 136 can be used to store metadata associated with uploaded data objects. Data object storage element 138 and metadata storage element 136 can include one or more of random access memory (RAM), read only memory (ROM), flash memory, electrically-erasable programmable read only memory (EEPROM), a hard disk, an optical disk, etc., or combinations thereof. In some embodiments, metadata storage element 136 and data object storage element 138 can be combined into one storage element or be distributed over two or more storage elements. Furthermore, metadata storage element 136 and/or data object storage element 138 can be integrated as part of one or more of the networked computing devices of remote computing system 130, or can be externally coupled to remote computing system 130.

In some embodiments, a client computing device such as any of computing device 110-120 can also act as remote computing system 130. Thus, a user with multiple computing devices can utilize one or more of the computing devices as remote storage for data objects. For example, the synchronization techniques described herein can be used to manage photos taken on a smartphone such as to synchronize the photos between the smartphone and the user's home computer.

Network 140 can provide communications between various entities, such as between any of computing devices 110-120 and remote computing system 130. Network 140 may include a local area network, a wide-area network, a virtual private network, the Internet, an intranet, an extranet, a public switched telephone network, an infrared network, a wireless data network, a cellular network, or any other data network or combinations thereof. Network 140 can be implemented with various network topology. Examples of suitable network topologies may include simple point-to-point, peer-to-peer, bus topology, star topology, ring topology, mesh topology, hybrid topology, or combinations thereof. Components utilized for such a network may depend upon the type of network and/or environment selected. Network 140 may utilize any suitable protocol, such as TCP/IP, OSI, FTP, UPnP, NFS, CIFS, and AppleTalk. Communication over network 140 can be implemented using wired or wireless connections, or combinations thereof.

Figure 2:
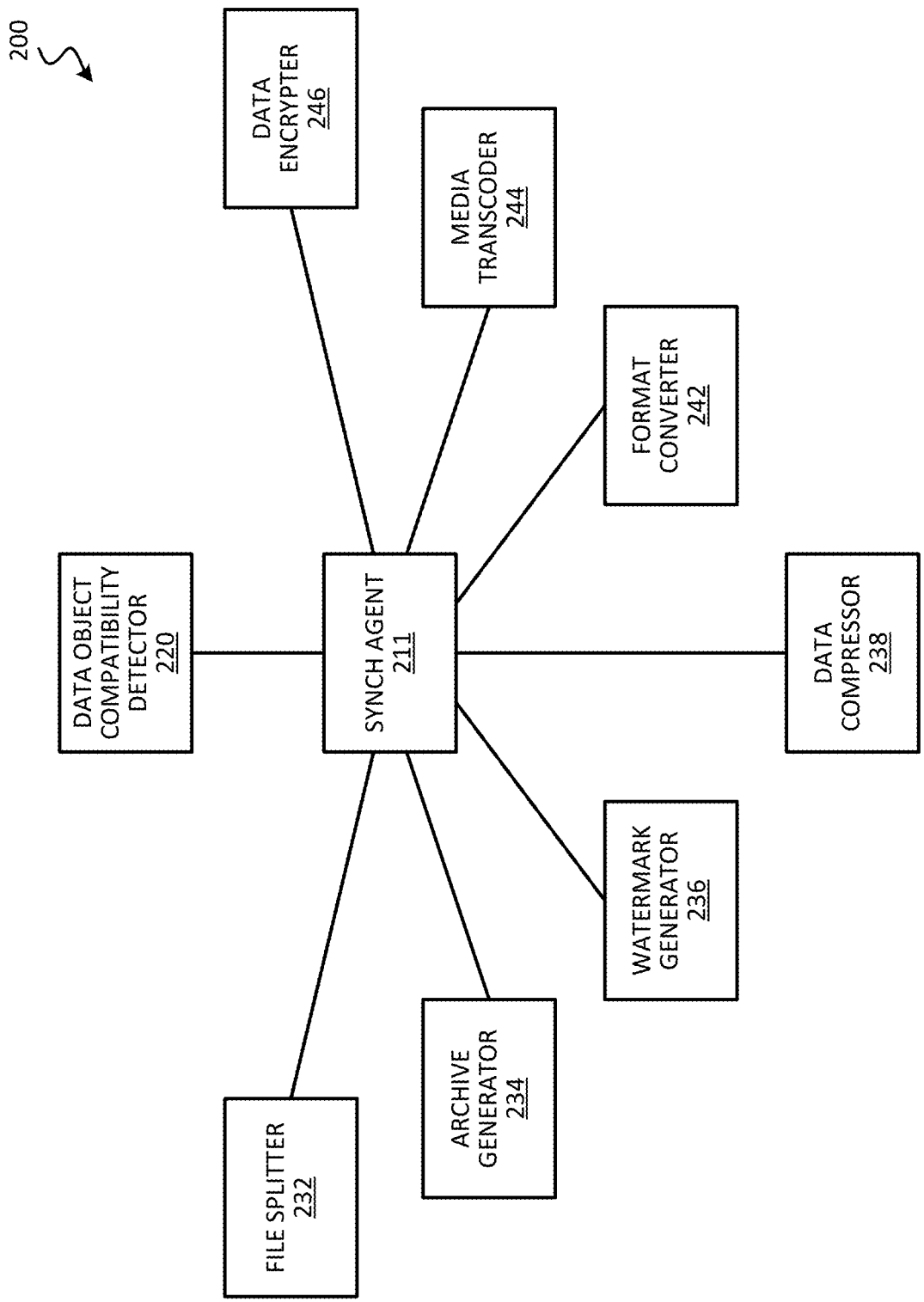
FIG. 2 illustrates a block diagram of a synchronization application, according to some embodiments.

FIG. 2 illustrates a block diagram of a synchronization application 200, according to some embodiments. Synchronization application 200 may include a synchronization agent 211, a data object compatibility detector 220, and various state transformation modules including, for example, file splitter 232, archive generator 234, watermark generator 236, data compressor 238, format converter 242, media transcoder 244, data encrypter 246, etc. In some embodiments, data object compatibility detector 220 and the various state transformation modules need not be integrated with synchronization application 200, and one or more of these modules can be separate applications or plugins that interact with synchronization application 200.

Synchronization agent 211 manages the synchronization operations (e.g., both synchronizing and unsynchronizing data objects) of a computing device, and may provide a user interface (e.g., a graphical user interface (GUI)) that allows a user to configure and control synchronization of data objects and their corresponding metadata. For example, synchronization agent 211 may allow a user to assign or designate one or more folders on a local computing device that is linked to a storage area associated with the user at a remote computing system. When a designated folder is set in the synchronized mode, synchronization agent 211 can synchronize changes made to the content of the designated folder (e.g., addition, removal, and/or modification of a data object and/or its metadata stored in the designated folder) to the remote computing system. In other words, synchronization agent 211 may store a copy of a designated folder and its contents at the remote computing system, and changes or modifications made to the designated folder at the local computing device are reflected to the remote computing system. In some embodiments, synchronization agent 211 can be configured to auto-synchronize the changes and modifications made to the content of a designated folder such that any changes and modifications are automatically synchronized on-the-fly or at a periodic interval to the remote computing system. In some embodiments, synchronization agent 211 can be configured to synchronize the changes and modifications made to the content of a designated folder in response to a manual command form the user to do so.

When a designated folder is set in the unsynchronized mode, synchronization agent 211 can back-up the contents of the designated folder to the remote computing system, and remove the data objects in the designated folder from the local computing device to free up at least some of the memory space taken up by the data objects. The metadata indicating one or more characteristics or properties of the data objects (e.g., date and/or time of creation, date and/or time of last modification, author, version, title, file type, encoding algorithm, classification information, tags, data source, size information such as memory size, pixel count, number of words, lines, paragraphs, resolution, etc.) can be retained at the local computing device. In some embodiments, the representation of the unsynchronized data object at the local computing device can be transformed into a file stub to indicate that the data object is no longer stored at the local computing device, but the metadata remains. For example, the file stub can be an icon representing the data object with some indicia to indicate the unsynchronized state of the data object.

In some embodiments, the synchronization and unsynchronization operations can be independently performed at the data object level on individual data objects (e.g., individual files) such that some data objects in a designated folder or elsewhere at the local computing device can be synchronized while other data objects in the designated folder or elsewhere can be unsynchronized. This can allow a user with the flexibility to retain data objects that a user frequently, recently, or is expected to use at the local computing device, while freeing up memory space that would otherwise be taken up by data objects that are not being used. In some embodiments, the synchronization and synchronization operations can be performed on a data object independently from its corresponding metadata. For example, metadata at a local computing device associated with an unsynchronized data object can be modified, and the changes to the metadata can be synchronized to the remote computing system without requiring the presence of the data object itself at the local computing device.

According to some embodiments, synchronization agent 111 can control how data objects are synchronized and stored at the local computing device and at the remote computing system such that a data object can be in different representative states at the different computing devices. It should be understood that changing the representative state or form of a data object does not change the necessary data content of the data object, although some state changes may change some of the metadata (e.g., size, file type, etc.) associated with the data object. By way of example, a text document can be stored as an editable Word document at the local computing device and be synchronized as a PDF document at the remote computing system. Although the text document is in different representative states (e.g., different file format) at the different computing devices, the underlying data content (e.g., the actual text) of the document can remain the same when the text document is synchronized between the computing devices.

In some embodiments, a data object compatibility detector 220 can be utilized to provide synchronization application 200 with a determination of what representative states are suitable for storing a particular data object at a computing device. Data object compatibility detector 220 may include or have access to a database or table of available file formats, media codecs, etc. for a particular type of data object. For example, available file formats for a text document may include Word, plain text, rich text, PDF, etc.; available file formats for an image may include bitmap, JPG, GIF, TIFF, PNG, etc.; available file formats/codecs for a video data object may include AVI, MOV, WMV, MP4, FLV, x265, DivX, etc.; available file formats/codecs for an audio data object may include MP3, WAV, WMA, M4A, FLAC, etc. Data object compatibility module 220 may track what state transformation modules are available at the computing device to determine if the computing device has the ability to transform the data object from one representative state to another representative state. Data object compatibility detector 220 may also track the capabilities and applications installed on the computing device and/or the remote computing device to determine which of the possible representative states of a data object is usable and can be opened at the corresponding computing device. For example, although MOV is a file format option for a video data object, if the computing device does not have the proper Quicktime application to open the MOV file, the MOV file format may be unsuitable for the computing device.

When a data object is selected for synchronization to a local or remote computing device, data object compatibility detector 220 can determine a set of suitable representative states for storing the data object at the target computing device, and provide the set of representative states to synchronization application 200. Synchronization application 200 may then provide different options for a user to select as to what representative state to store the data object at the local and/or remote computing devices. In some embodiments, as the operating environment of the local and/or remote computing devices change (e.g., installing a new application, removing an old application, etc.), data object compatibility detector 220 can monitor these changes and revise the suitable representative states for a particular data object. In this manner, the available options for transforming the representative state of a data object can be dynamically adapted to the environment of the local and/or remote computing devices.

FIG. 2 also illustrates various state transformation modules that can be executed by a computing device to transform a data object form one representative state to another (e.g., from one file format to another file format). Although various state transformation modules are shown, it should be understood that in some embodiments, one or more of the state transformation modules can be omitted, and in some embodiments, one or more other state transformation modules no specifically shown can be present. Furthermore, while the state transformation modules are shown as part of synchronization application 200, any of the state transformation modules can be a separate application or a separate plugin that is accessible by synchronization application 200. In addition, a state transformation module need not be resident on the same computing device as synchronization application 200. For example, in some embodiments, synchronization application 200 may invoke a state transformation module on a different computing device to perform the state transformation of a data object.

File splitter 232 can be an application or a plugin that splits data objects such as large files into smaller data objects or smaller files. File splitter 232 can be useful in scenarios in which a service provider limits the file size that can be uploaded to or downloaded from a computing device. In some embodiments, file splitter 232 can provide different split size options for a user to select. For example, file splitter 232 can be configurable to split large data objects into 100 MB, 500 MB, 1 GB, 2 GB data objects, or a custom size defined by the user. Data objects that are smaller than the configured size are not split. When invoked, file splitter 232 can transform the representative state of a data object into a folder containing a set of smaller data objects. In some embodiments, file splitter 232 can be configured to operate on all data objects within a designated folder, or file splitter 232 can operate on selected individual data objects for which the split size of each data object can be independently set. In some embodiments, file splitter 232 can also be used to join split data objects back together into the original larger data object.

Archive generator 234 can be an application or a plugin that merges multiple data objects into a single archive file such as a ZIP file, RAR file, etc. Archive generator 234 can be useful in scenarios in which multiple data objects or files relating to a common subject is being shared. By archiving the multiple data objects into a single archive file, only the single archive file needs to be shared as opposed to sharing each of the multiple data objects. When multiple data objects are selected for archiving, archive generator 234 can transform the representative state of data objects into a single archive file containing the multiple data objects. In some embodiments archive generator 234 can be configured to operate on a designated folder such that all data objects in the designated folder is archived into a single archive file. In some embodiments archive generator 234 can operate on selected data objects within a folder such that the selected data objects are transformed into an archive file, and other data objects in the folder remain distinct data objects. In some embodiments, archive generator 234 can also be used to ungroup an archived file into multiple data objects that made up the archived file.

Watermark generator 236 can be an application or a plugin that inserts a watermark into a data object. Watermark generator 236 can be useful in scenarios in which a user wants to add a visual indication to a data object without changing the underlying content of the data object. For example, a watermark can be added to a data object to indicate that the data object is confidential, urgent, an un-finalized draft, a sample, etc. A watermark can be added to a data object to indicate the source or attribution of the content, the proprietary nature of the content, or other indication to discourage counterfeit or copying. More generally, a watermark can be added to a data object to convey any message, image, or sound to a recipient of the data object. In some embodiments, watermark generator 236 can provide various options for a user to select. For example, watermark generator 236 may provide a set of commonly used watermarks to select from and/or allow the user to enter a custom watermark (e.g., letter(s), word(s), image(s), sound(s), etc.). Watermark generator 236 may also provide options for the color of the watermark, transparency level of the watermark, location of the watermark (e.g., location on a page, an image, or video frame), and/or frequency of the watermark (e.g., watermark on every page or frame, watermark after a predetermined number of pages or frames, or selected pages or frames only, etc.). When invoked, watermark generator 236 can transform the representative state of a data object into watermarked data object. In some embodiments, watermark generator 236 can be configured to operate on all data objects within a designated folder, or watermark generator 236 can operate on selected individual data objects in which the watermark for each data object can be independently configured. In some embodiments, the watermark option may be unavailable for data objects (e.g., executable data objects, etc.) that are not intended to be presented to a user visually or audibly. In some embodiments, watermark generator 236 can also be used to remove a previously inserted watermark from a data object.

Data compressor 238 can be an application or plugin that compresses a data object to reduce the memory size taken up by the data object. In some embodiments, the data compression can be lossless such that no information is lost. In some embodiments, the data compression can be allowed to be lossy such that unnecessary information (e.g., inaudible frequencies in an audio data object, etc.) can be removed without losing necessary data content.

In some embodiments, data compressor 238 can provide different options for a user to select, such as different compression algorithms, lossless or lossy compression, target resolution, target frame rate, target bit rate, etc. When invoked, data compressor 238 can transform the representative state of a data object into a compressed data object. In some embodiments, data compressor 238 can be configured to operate on all data objects within a designated folder, or data compressor 238 can operate on selected individual data objects for which the compression options of each data object can be independently set. In some embodiments, data compressor 238 can also be used to decompress a previously compressed data object.

Format converter 242 can be an application or plugin that converts a data object from one format to another. Format converter 242 can be useful in scenarios in which a computing device lacks the proper application to open a data object. In such scenarios, a data object can be converted into a suitable file format such that the data object can be properly opened by the computing device. In some embodiments, format convert 242 can include multiple converters that are each designed to convert a particular type of data object. For example, format converter 242 may include a document converter to convert text-based data objects, an image converter to convert images or photos, a video converter to convert video data objects, an audio converter to convert audio data objects, etc. Format converter 242 can provide different target file format options for a user to select. In some embodiments, the allowable target file format options provided to a user may depend on which computing device the data object is to be stored and the capabilities of the computing device. For example, if the data object is intended to be opened at a computing device, the allowable target file format options can be limited to formats supported by applications installed at the computing device. If the data object is only intended to be stored at the computing device (e.g., at a remote computing system) and it is not necessary to open the data object at that computing device, then the allowable target file format options can be any compatible format that format convert 242 supports. In some embodiments, the allowable target file format options for a particular data object can be determined by data object compatibility detector 220. In some embodiments, format convert 242 can be configured to operate on all applicable data objects within a designated folder, and the target file format for different types of data objects in the designated folder can be independently set. In some embodiments, format convert 242 can operate on selected individual data objects for which the target file format of each data object can be independently set such that different data objects, even if they are of the same type, can be independently converted into different file formats.

Media transcoder 244 can be an application or plugin that converts a media data object from one encoding to another. Media transcoder 244 can be useful in scenarios in which a computing device lacks the proper codec to play a media data object. In such scenarios, a media data object can be transcoded into a suitable codec format such that the media data object can play properly at the computing device. In some embodiments, media transcoder 244 can include one or more of an image transcoder, an audio transcoder, and a video transcoder, and each transcoder may employ a set of codecs for encoding the particular media type. Media transcoder 244 can provide different codec and properties options for a user to select. In some embodiments, the allowable options provided to a user may depend on which computing device the media data object is to be stored and the capabilities of the computing device (e.g., installed applications, display resolution, audio frequency range, etc.). For example, if the media data object is intended to be opened at a computing device, the allowable options can be limited to formats that can be properly opened by the computing device. If the media data object is only intended to be stored at the computing device (e.g., at a remote computing system) and it is not necessary to play the media data object at that computing device, then the allowable options can be any option for the media type that media transcoder 244 supports. In some embodiments, the allowable transcoder options for a particular media data object can be determined by data object compatibility detector 220. In some embodiments, media transcoder 244 can be configured to operate on all applicable media data objects within a designated folder, and the transcoding options for different media types in the designated folder can be independently set. In some embodiments, media transcoder 244 can operate on selected individual data objects for which the transcoding options of each data object can be independently set such that different data objects, even if they are the same type of media, can be independently transcoded into different media formats. In some embodiments, at least some of the functionalities of media transcoder 244 can be performed by format converter 242, or vice versa.

Data encrypter 246 can be an application or plugin that encrypts/decrypts a data object. Data encrypter 246 can be useful to enhance the security of a data object stored at a computing device, for example, if the data object contains confidential or proprietary information. Data encrypter 246 can be implemented as a cryptographic engine that can perform various encryption algorithm, and may provide a user with options to select different encryption algorithm and/or different encryption keys. For example, data encrypter 246 can be configured to encrypt different data objects using the same algorithm but with different keys. In some embodiments, data encrypter 246 can also be used to password or passcode protect a data object. Data encrypter 246 can be configured to operate on all data objects within a designated folder such that all data objects in the designated folder is encrypted using the same encryption options. In some embodiments, data encrypter 246 can operate on selected individual data objects such that the encryption options for each data object can be set independently and to allow for some data objects in the same directory to remain unencrypted. In some embodiments, data encrypter 246 can also be used to decrypt a previously encrypted data object.

According to some embodiments, multiple state transformation modules can be employed to transform a data object. For example, a MP4 video data object can be transformed into a AVI video data object that is watermarked and split into smaller encrypted files by converting the file format from MP4 to AVI, inserting a watermark into the AVI file, splitting the watermarked AVI file into smaller files, and encrypting each of the smaller files. It should also be understood that when multiple state transformation modules are employed, the state transformations can be performed in any suitable order to reach the final representative state of the data object.

Figure 3:
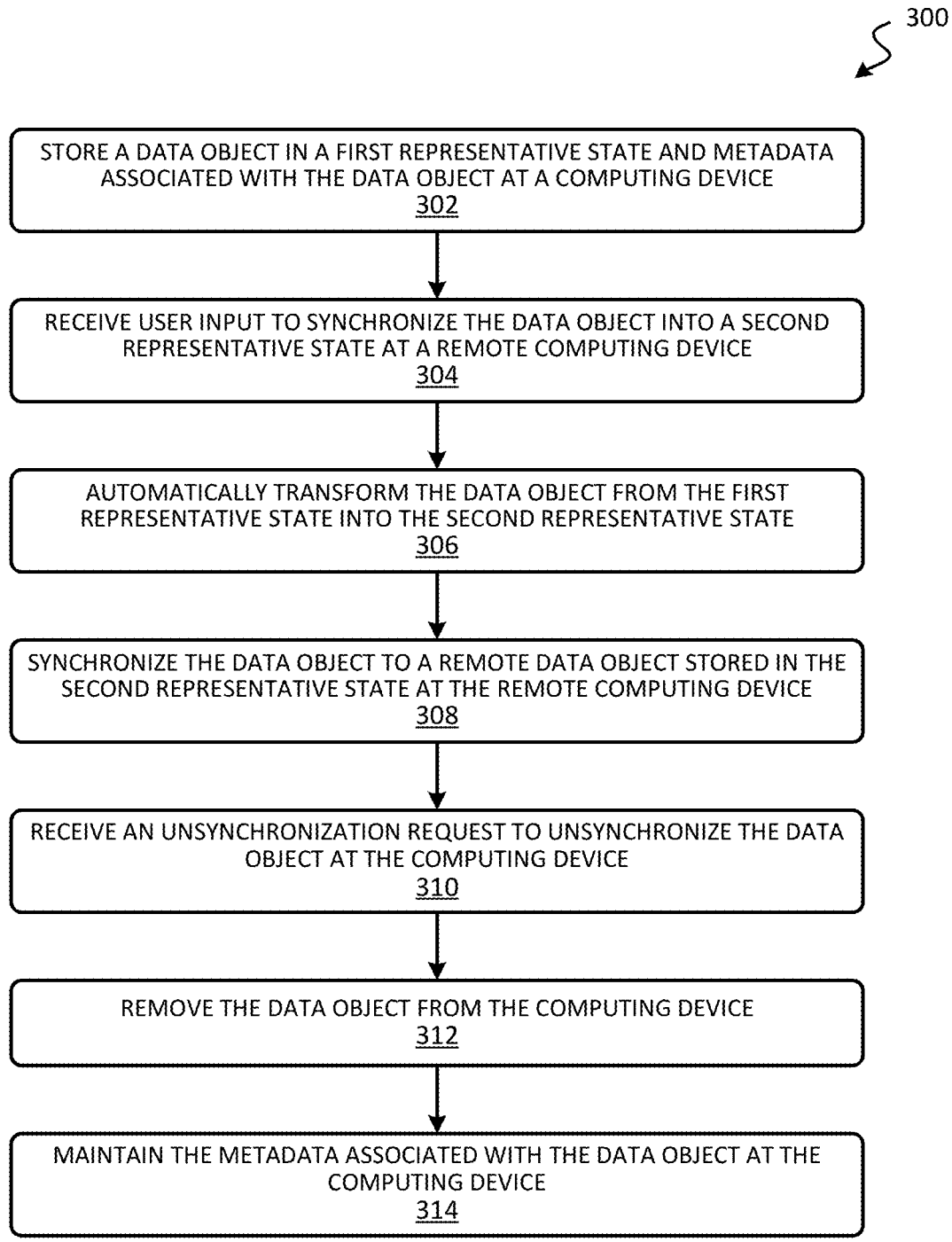
FIG. 3 illustrates a flow diagram of a process for managing data objects, according to some embodiments.

FIG. 3 illustrates a flow diagram of a process 300 for managing data objects, according to some embodiments. Process 300 can be performed by a computing device (e.g., a user's computing device executing a synchronization application) to synchronize and unsynchronize data objects to and from another computing device (e.g., a remote computing device). Process 300 may begin at block 302 by storing a data object (e.g., a file) and metadata associated with the data object at a computing device (e.g., a local computing device). In some embodiments, the data object can be a file created by a user, or a data objected accessed by the computer device and saved onto the computing device. The metadata can include information indicating one or more characteristics or properties of the data object (e.g., date and/or time of creation, date and/or time of last modification, date and/or time of last access, version, title, file type, encoding algorithm, classification information, tags, source, size information such as memory size, pixel count, number of words, lines, paragraphs, resolution, bit rate, etc.). It should be understood that some metadata may be associated with only certain types of data objects, while other metadata may be applicable to all data objects.

The data object can be stored in a local representative state at the computing device. The local representative state can be a native form of the data object (e.g., a form associated with the application that created or was used to access the data object, or a form of the data object as it was obtained by the computing device). For example, if the data object is a document created by a Word application, the data object can be stored as a Word file at the computing device. As another example, if the data object is a MP3 song purchased from an online music store, the data object can be stored as a MP3 file at the computing device. In some embodiments, the data object can be stored in a representative state at the computing device that is different than the native form of the data object. For example, the data object can be transformed from a native form into a different representative state, and the data object can be stored at the computing device in the transformed state as the local representative state.

At block 304, process 300 may receive user input to synchronize the data object stored in the local representative state at the computing device into a remote representative state at a remote computing device. The user input may include selecting the data object in a folder or directory of a file system (e.g., right-clicking on a file) to invoke a context menu, and selecting a synchronize command from the context menu. In some embodiments, one or more folders or a directory associated with one or more folders on the computing device can be designated for synchronization, and the user input to synchronize the data object may include placing or moving the data object into the designated folder or directory.

The remote representative state can be a form of the data object that is different than the local representative state of the data object stored at the computing device. For example, the remote representative state of the data object can be a split file state in which the data object is split into smaller data objects, a compressed state in which the size of the data object is reduced to lower the amount of memory needed to store the data object, an archived state in which the data object is grouped together with one or more other data objects into an archive file, a converted format state in which the data object is converted into a different file format than the file format associated with the local representative state of the data object, a watermarked state in which one or more watermarks are inserted into the data object, a media transcoded state in which the data object is transcoded according to a different codec than the codec associated with the local representative state, an encrypted state in which the data object is encrypted to improve the security protection of the data object, or any combination thereof.

In some embodiments, a set of potential representative states that the data object can be transformed into may be provided as options for a user to choose from. For example, the computing device can display a set of potential representative states in a context menu when the data object is selected for synchronization or when a synchronization application is invoked or selected, for example, from a toolbar, taskbar, or system menu. The set of potential representative states can be categorized according to transformation types and options available for each transformation type. In some embodiments, the context menu may provide a tab for each transformation type, and selection of a tab may bring up a submenu showing the available options for the selected transformation type. By way of example, the available options for file splitting transformation may include predetermined and/or custom split file sizes; the available options for compression transformation may include compression algorithms and/or target file sizes; the available options for the archiving transformation may include archiving formats; the available options for format conversion transformation may include compatible file formats; the available options for the archiving transformation may include archiving formats; the available options for format conversion transformation may include compatible file formats; the available options for media transcoding transformation may include codecs and/or other encoding options such as resolution, bit rate, etc.; the available options for watermark transformation may include predetermined and/or custom watermarks, and location and/or size of the inserted watermark; the available options for encryption transformation may include encryption algorithms and encryption keys; etc.

In some embodiments, the set of potential representative states being displayed can be limited to transformative states that are applicable to or compatible with the particular type of data object being selected for synchronization. For example, a WAV file option (which is only applicable to audio data objects) may not be a potential representative state for a text-based data object and would not be presented as an available option in the context menu (e.g., the option may not be displayed, or be grayed out such that the option cannot be selected).

The remote representative state to synchronize the data object into at the remote computing device can then be selected from the set of potential representative states. For example, the computing device may receive a user selection of the remote representative state from the set of potential representative states being displayed in the context menu. In some embodiments, the selected remote representative state may include a combination of options selected for multiple transformation types. For example, a remote representative state of a data object can be a modified PDF document that is derived by converting a WORD file into a PDF file, reducing the resolution of the PDF file by half, and encrypting the reduced-resolution PDF file using AES encryption with a 128-bit key.

In some embodiments, the user selection of the remote representative state can be applied to other data objects in the designated folder or directory such that a user does not need to set the remote representative state for each data object in the folder or directory designated for synchronization. In other words, a user may only need to set the remote representative state once, and the remote representative state would apply to other data objects in the same folder or directory. In some embodiments, each data object in the directory can be independently configurable as to what remote representative state to synchronize the corresponding data object into at the remote computing device. In other words, the user selection of the remote representative state would only apply to the selected data object, and the remote representative state for other data objects in the folder or directory can be independently set to some other state.

At block 306, in response to receiving the user input to synchronize the data object, the data object can be automatically transformed from the local representative state into the remote representative state. It should be understood that in some embodiments, the representative state of the data object is automatically transformed in the sense the transformation is performed as part of the synchronization operation, and the user is not required to provide separate input to manually transformed the data object before synchronizing the data object. One or more state transformation applications or plugins installed on or accessible by the computing device can be invoke to transform the data object. In some embodiments, if a state transformation application or plugin is not installed on the computing device, the user may be prompted to install the necessary application or plugin, or to modify the selection of the remote representative state. In some embodiments, if a state transformation application or plugin is not installed on the computing device, the computing device may access a remote service to perform the transformation, or send the data object to the remote computing device and request the remote computing device to perform the transformation.

According to some embodiments, transforming the data object from the local representative state into the remote representative state may include performing one or more of splitting the data object into multiple smaller data objects, joining the data object with other data objects into a larger data object, compressing or decompressing the data object, archiving the data object with other data objects into an archived data object, converting the data object from a first format into a second format, inserting or removing a watermark from the data object, encrypting or decrypting the data object, transcoding the data object, etc. In some embodiments, transforming the data object form the local representative state into the remote representative state may include performing a combination of two or more of the state transformations described herein.

At block 308, once the data object has been transformed from the local representative state into the remote representative state, the data object and metadata associated with the data object can be synchronized to a remote data object in the remote representative state and remote metadata associated with the remote data object at the remote computing device. When the data object at the computing device is synchronized with the remote data object, changes and modifications made to the data content of the data object at the computing device can be reflected to the remote data object irrespective of the representative state that the remote data object is in. Thus, for example, a local data object can be unencrypted whereas the remote data object is encrypted, but changes made to the local data object are synchronized to the encrypted remote data object; a local data object can be encrypted with a different key than the remote data object, but changes made to the local data object are synchronized between the copies of the data objects; a remote AVI file can appear as a MP4 file at the local computing device but changes made to the video content are synchronized between the copies of the video file; etc. In some embodiments, the changes and modifications made to a local data object at the computing device can be synchronized to the corresponding remote data object on-the-fly or be synchronized at a periodic interval (e.g., every minute, every 5 minutes, 10 minutes, etc.). In some embodiments, the changes and modifications made to a local data object at the computing device can be synchronized to the corresponding remote data object in response to a user command, or when the changes and modifications are saved to the local data object.

In order to preserve the representative states of the data object at the computing device and at the remote computing device, when changes and modifications are made to the local data object, the modified data object can be transformed into the remote representative state, and the remote data object stored at the remote computing device can be replaced with the transformed modified data object. However, synchronizing changes and modifications for large data objects in this manner may require some time to transfer the entire modified data object. As such, in some embodiments, instead of transferring the entire modified data object, the changes and modifications can be synchronized to the remote data object by transferring only the portion of the data object that has changed, or by instructing the remote computing device to make the changes and modifications to the remote data object at the remote computing device.

In some embodiments, the metadata associated with a data object can include synchronizable metadata that are synchronized to remote metadata associate with the data object, and independent metadata that need not be synchronized with the remote metadata. For example, characteristics and properties that are related to the underlying data content of the data object (e.g., title, author, version, etc.) can be synchronized across the copies of the metadata, whereas characteristics and properties that are related to the representative state of the data object (e.g., file type, encryption algorithm, codec, etc.) can remain independent between the local data object and the remote data object. The metadata associated with a data object can be modified independently from the data content of the data object. Changes and modifications made to the synchronizable metadata at the local computing device can be reflected to the corresponding remote metadata at the remote computing device, whereas changes and modifications made to the independent metadata at the local computing device or at the remote computing device can remain unsynchronized and independent form each other.

For example, an audio file of a song by a particular artist can be stored as a MP3 file at the local computing device. The metadata at the local computing device for the audio file may include synchronizable metadata such as song title, artist, and genre, and independent metadata such as bit rate and format as a MP3 file. The audio file can be synchronized as a WMA file at the remote computing device, and the remote metadata at the remote computing device for the audio file may include the same song title, artist, genre, bit rate, but have the format as a WMA file. When the use modifies the genre at the local computing device and down convert the bit rate, the changes to the genre can be reflected to the remote metadata, but the changes to the bit rate can remain independent between the local and remote computing devices.

In some embodiments, all metadata associated with a data object can be synchronizable, and the metadata stored at a particular computing device may include information about the representative state of the data object at another computing device. For example, using the same audio file as above for illustration, the metadata at the local computing device for the audio file may include song title, artist, genre, bit rate and format of the local file, and bit rate and format of the remote file. Similarly, the remote metadata at the remote computing device for the audio file may include song title, artist, genre, bit rate and format of the local file, and bit rate and format of the remote file. Changes to the genre, bit rate, and format of the local file made to the local metadata can be synchronized to the remote metadata, and vice versa.

At block 310, an unsynchronization request to unsynchronize the data object at the computing device can be received to free up at least some of the memory space taken up by the data object at the computing device. For example, a user may select the data object or invoke a synchronization application from a toolbar, taskbar, or system menu to invoke a context menu, and select an unshcnronization command from the context menu. In some embodiments, the unsynchronization request can be applied to the selected data object or all data objects within a designated folder or directory.

At block 312, in response to receiving the unsynchronization request, the data object is removed from the computing device to free up at least some of the memory taken up by the data object at the computing device. In this manner, the data object need not be stored locally at the computing device until the data object is needed or used at the computing device. At block 314, although the data object is no longer stored at the computing device, the metadata associated with the data object at the computing device can be still be maintained at the computing device. For example, in addition to metadata relating to the underlying content of the data object, maintaining the metadata associated with the data object at the computing device may also include storing information at the computing device indicating that the data object was previously stored in the local representative state at the computing device and/or storing information at the computing device indicating that the remote data object corresponding to the data object is stored in the remote representative state at the remote computing device. Further, the representation of the data object at the computing device can be transformed into a file stub, such that manipulations of the data object and/or its metadata can still be performed at the computing device. For example, an icon representing the data object at the computing device can include a badge or an indicator to indicate that the data object is no longer stored at the computing device, and/or a file extension can be added to the file name to indicate that the data object is no longer stored at the computing device. A user can still interact with the icon at the computing device to manipulate the metadata or issue commands to manipulate the data object.

In some embodiments, a history of the local representative states and/or remote representative states (e.g., a number of most recently used states) of the data object can be maintained at the computing device and/or at the remote computing device. The history of the most recently used states can be useful when re-synchronizing the data object or changing the representative state of the data object locally or remotely. For example, when a data object is selected for re-synchronization, a context menu can display a set of most recently used states to choose from such that a user does not have to re-select the various options for the different transformation types.

Figure 4:
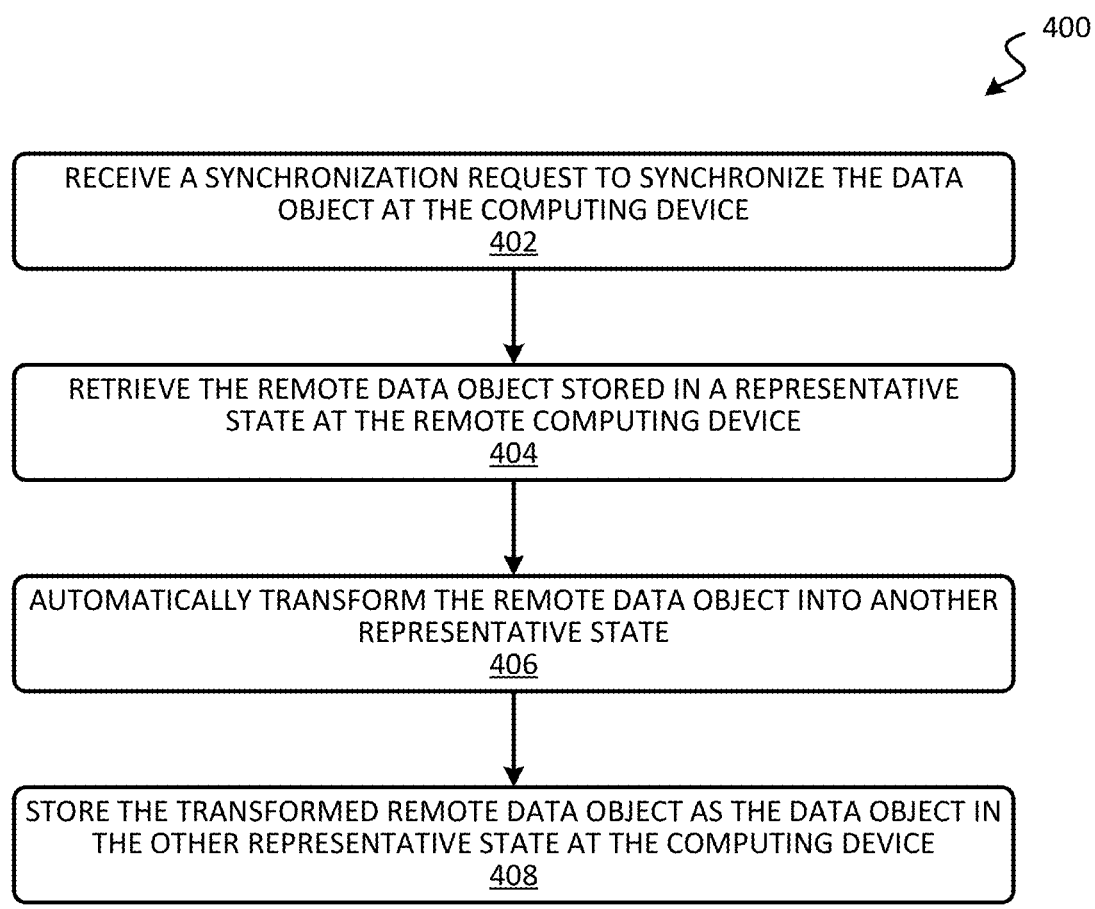
FIG. 4 illustrates a flow diagram of another process for managing data objects, according to some embodiments

FIG. 4 illustrates a flow diagram of another process 400 for managing data objects, according to some embodiments. Process 400 can be performed by a computing device (e.g., a user's computing device executing a synchronization application) to resynchronize data objects from another computing device (e.g., a remote computing device). Process 400 can be performed after a data object that was previously synchronized to a remote data object has been unsynchronized and removed from the computing device.

Process 400 may begin by receiving a synchronization request to synchronize a data object at the computing device. For example, a user may select an icon or file stub representing the data object at the computing device or invoke a synchronization application from a toolbar, taskbar, or system menu to pull up a context menu, and select a synchronize command from the context menu. In some embodiments, the synchronization request can be applied to the selected data object or all data objects within a designated folder or directory.

At block 404, in response to receiving the synchronization request, the remote data object corresponding to the selected data object stored in a remote representative state at the remote computing device is retrieved. For example, the computing device may send a request to the remote computing device with a data object identifier identifying the selected data object. At block 406, the remote data object can be automatically transformed from the remote representative state into a local representative state for storage at the computing device. In some embodiments, the local representative state can be the most recent representative state of the data object stored at the computing device. Thus, for example, if the data object was last stored as an AVI file at the computing device and synchronized as a MP4 file at the remote computing device, the MP4 file will be retrieved from the remote computing system and be transformed into an AVI file. In some embodiment, the transformation can be performed by the remote computing device by invoking one or more state transformation applications or plugins available to the remote computing device before transferring the data object to the computing device. In some embodiments, the remote computing device may transfer the remote data object in the remote representative state to the computing device, and the computing device may transform the data object from the remote representative state to the local representative state. In some embodiments, if a state transformation application or plugin is available to one computing device but not the other, the two computing device can operate cooperatively together to perform the transformation such that some state transformation(s) are performed by one computing device and the remaining state transformation(s) necessary to transform the data object into the local representative state are performed by the other computing device.

In some embodiments, the local representative state can be a different representative state than the most recently used state of the data object at the computing device. For example, subsequent to synchronizing the data object into a remote data object in the remote representative state at the remote computing device, a user may modify the local representative state of the data object into some other state. By way of illustration, a data object that was originally represented as a AVI file at the computing device can be synchronized into a MP4 file at the remote computing device. Subsequently, a user may unsynchronize the file such the AVI file is removed from the computing device. Thereafter, the user may modify the local representative state to a MOV file. This modification to the local representative state may occur without the data object being present at the computing device. When the synchronization request is received to synchronize the data object back to the computing device, instead of transforming the remote MP4 file into an AVI file, the MP4 file can be transformed into a MOV file.

According to some embodiments, transforming the data object from the remote representative state into the local representative state may include performing one or more of splitting the data object into multiple smaller data objects, joining the data object with other data objects into a larger data object, compressing or decompressing the data object, archiving the data object with other data objects into an archived data object, converting the data object from a first format into a second format, inserting or removing a watermark from the data object, encrypting or decrypting the data object, transcoding the data object, etc. In some embodiments, transforming the data object form the remote representative state into the local representative state may include performing a combination of two or more of the state transformations described herein.

At block 408, the transformed remote data object is stored as the local data object in the local representative state at the computing device. Thereafter, changes and modifications made to the local data object can be reflected to the remote data object irrespective of the different representative states in which the data object is stored locally and remotely.

FIGS. 5-12 illustrate various graphical user interfaces for implementing the synchronization techniques described herein, according to some embodiments. The graphical user interfaces can be displayed on a computing device operated by a user, and can be implemented with various operating systems including Windows, iOS, Android, etc.

Figure 5:
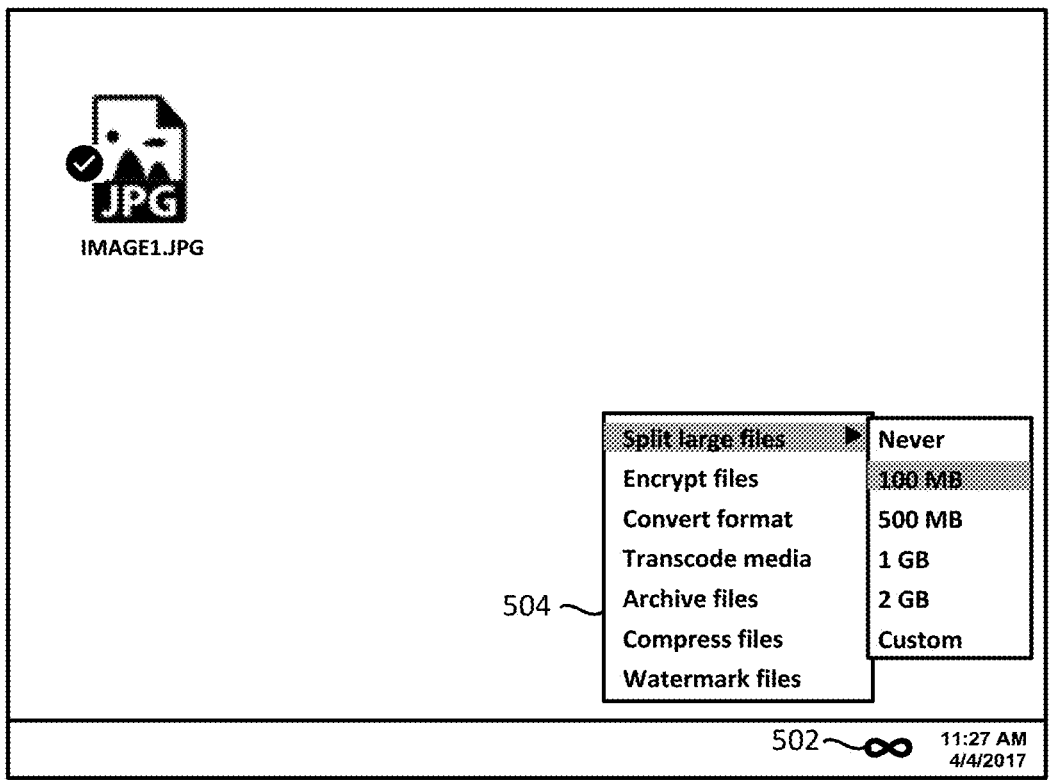
FIGS. 5-12 illustrates various graphical user interfaces displaying the contents of a folder or directory in a file system of a computing device, according to some embodiments.

FIG. 5 illustrates a graphical user interface displaying the contents of a folder or directory in a file system of a computing device, according to some embodiments. In some embodiments, the folder or directory can be associated with a desktop of the computing device or a designated folder stored on the computing device. The graphical user interface may include an area to display the contents (e.g., data objects) of the folder or directory, and a taskbar or toolbar that provides a shortcut 502 to a synchronization application or plugin installed on the computing device. The folder or directory being displayed may already include an image data object (IMAGE1.JPG) that is already synchronized to a remote data object stored at a remote computing device. In some embodiments, an indicator such as a badge, a checkmark (as shown), a color scheme, or other indicia can be added to an icon representing the data object to indicate that the data object is synchronized to a remote computing device.

In some embodiments, a user may invoke the synchronization application or plugin by selecting (e.g., right-clicking) shortcut 502. In response to the user selecting shortcut 502, a context menu 504 may pop up on the graphical user interface. Context menu 504 may provide various options as to what remote representative state to synchronize a data object into at the remote computing device. For example, context menu 504 may present a tab for each type of transformation, and selecting a tab will pull up a submenu with options for the selected transformation. As shown in FIG. 5, the various tabs presented in context menu 504 may represent different types of transformation such as split large files, encrypt files, convert format, transcode media, archive files, compress files, watermark files, etc. By way of example, when the split large files tab is selected, a submenu with options to disable the transformation and different split file sizes can be displayed. The user may then select, for example, a split file size of 100 MB as the remote representative state such that when a data object is synchronized to a remote computing system, the local data object will be split into smaller files with a maximum size of 100 MB. In some embodiments, multiple options for the various transformation types can be combined together to specify the remote representative state.

When the remote representative state is specified in a context menu that is invoked by selecting a shortcut to the synchronization application or plugin as shown (as opposed to a context menu pulled up by selected a data object itself), the specified remote representative state can be applied to all data objects within the folder or directory designated for synchronization. Thus, in the example shown in FIG. 5, all subsequent data objects that are placed in the folder or directory will be synchronized into a remote representative state of split files that are at most 100 MB. In some embodiments, the specified remote representative state may apply only to data objects that are subsequently added to the designated folder or directory, and data objects that were pre-existing before modify the remote representative state is not affected. Thus, in the example shown in FIG. 5, if the IMAGE1.JPG file was previously synchronized into an unsplit remote data object at the remote computing device, the remote data object corresponding to the IMAGE1.JPG file is unaffected by the newly specified remote representative state of splitting files into 100 MB. In some embodiments, the newly specified remote representative state can be retroactively applied to pre-existing data objects in the designated folder or directory such that the remote data object corresponding to the IMAGE1.JPG file would be split into smaller files at the remote computing device.

Figure 6:
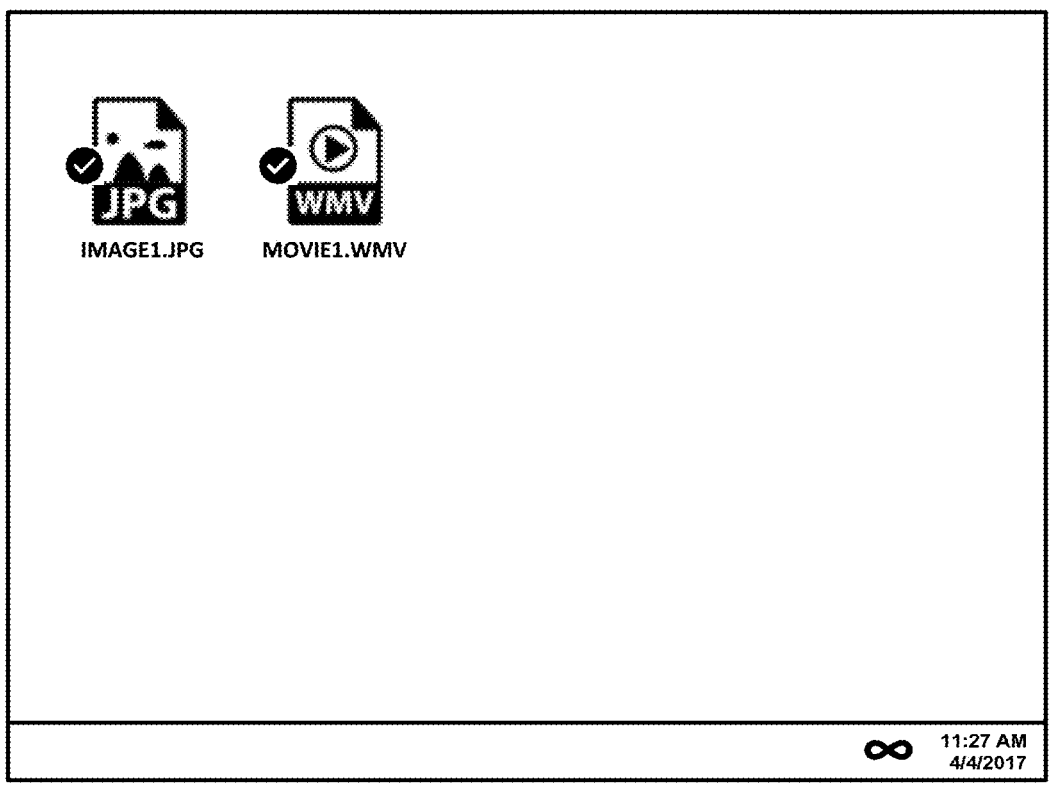

Referring to FIG. 6, subsequent to specifying the remote representative state as splitting files into 100 MB, when the user places a new file into the designated folder or directory, the new data object can be automatically synchronized to the remote computing system according to the specified remote representative state. Thus, when the user places the MOVIE1.WMV file into the directory shown in FIG. 6, the MOVIE1.WMV file will be automatically split into smaller 100 MB files and synchronized into a folder containing the smaller split files at the remote computing device. Once the MOVIE1.WMV file is synchronized, an indicator such as a badge, a checkmark (as shown), a color scheme, or other indicia can be added to the icon representing the MOVIE1.WMV file to indicate that the file is synchronized to a remote computing device.

Figure 7:
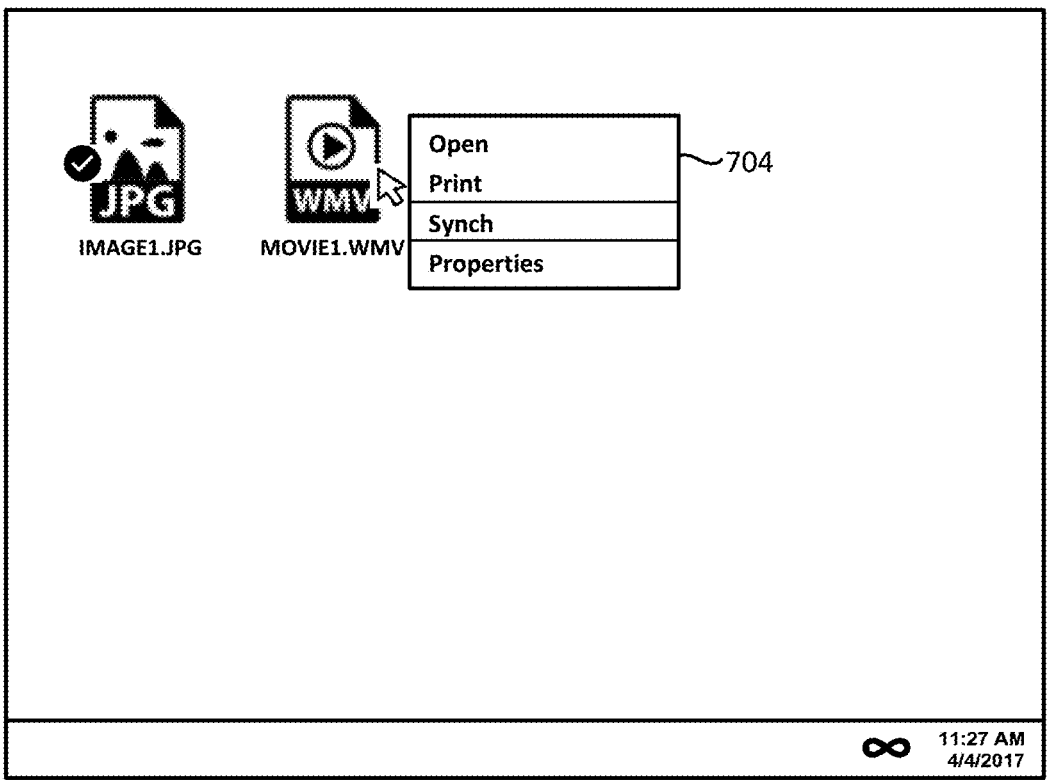

In some embodiments, instead of automatically synchronizing any changes made to a designated folder or directory, data objects within a folder or directory can be selectively chosen for synchronization. FIG. 7 illustrates a graphical user interface that allows independent selection of data objects for synchronization, according to some embodiments. In FIG. 7, when a user adds the MOVIE1.WMV file into the designated folder or directory, the MOVIE1.WMV file is not automatically synchronized to a remote computing device. To synchronize the newly added file, a user may select (e.g., right-click) the MOVIE1.WMV file to pull up a context menu 704. A "synch" command can then be selected from context menu 704 to synchronize the MOVIE1.WMV file to a remote data object at the remote computing device. In some embodiments, the MOVIE1.WMV file can be synchronized according to the remote representative state as specified in the context menu 504 in FIG. 5. Thus, in response to the "synch" command, the MOVIE1.WMV file can be stored at the remote computing device as a set of smaller split files. When the MOVIE1.WMV file is synchronized to the remote computing device, and changes or modifications made to the MOVIE1.WMV file at the local computing device can be reflected to the corresponding set of smaller split files at the remote computing device.

Figure 8:
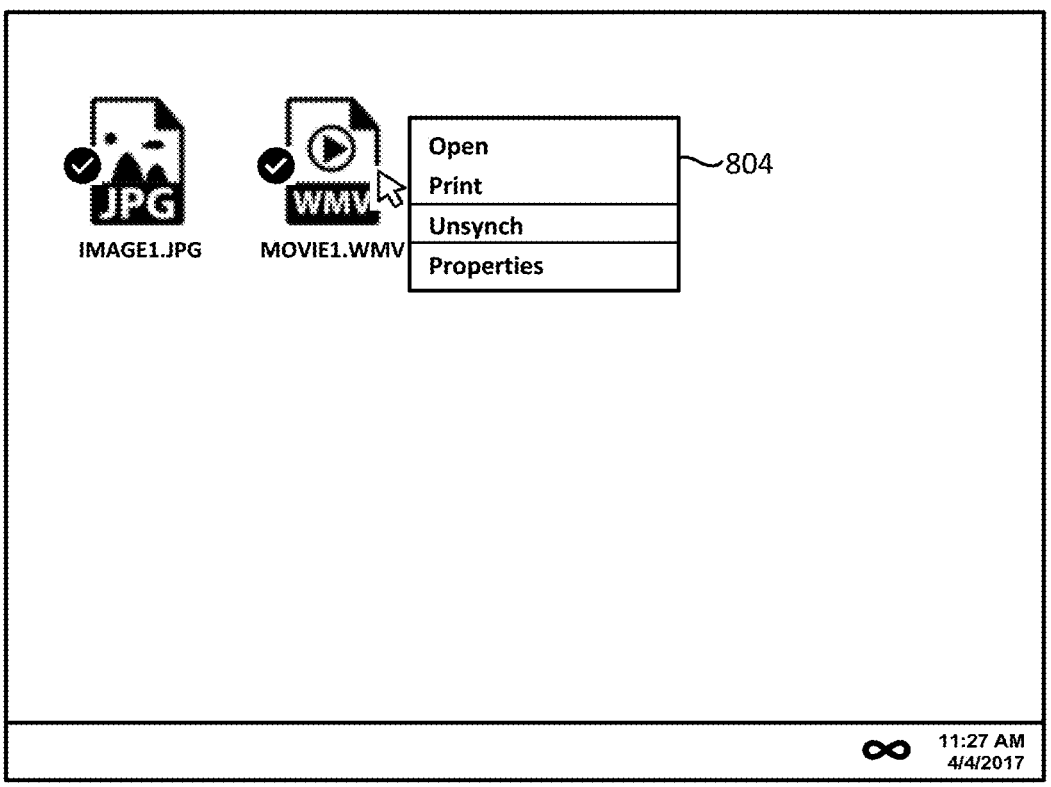

Once a data object has been synchronized to a remote computing device, when the data object is no longer needed or no longer in use at the local computing device, the data object can be selectively unsynchronized independently from other data objects in the designated folder or directory. FIG. 8 illustrates a graphical user interface that allows independent selection of data objects for unsynchronization, according to some embodiments. In FIG. 8, a user may select (e.g., right-click) the synchronized MOVIE1.WMV file to pull up a context menu 804. An "unsynch" command can then be selected from context menu 804 to unsynchronize the MOVIE1.WMV file. In response to the "unsynch" command, any changes and modifications (if any) made to the MOVIE1.WMV file since the last synchronization can be reflected to the corresponding remote data object at the remote computing device, and the local MOVIE1.WMV file can then be removed from the computing device to free up the memory space taken up by the MOVIE1.WMV file.

Figure 9:
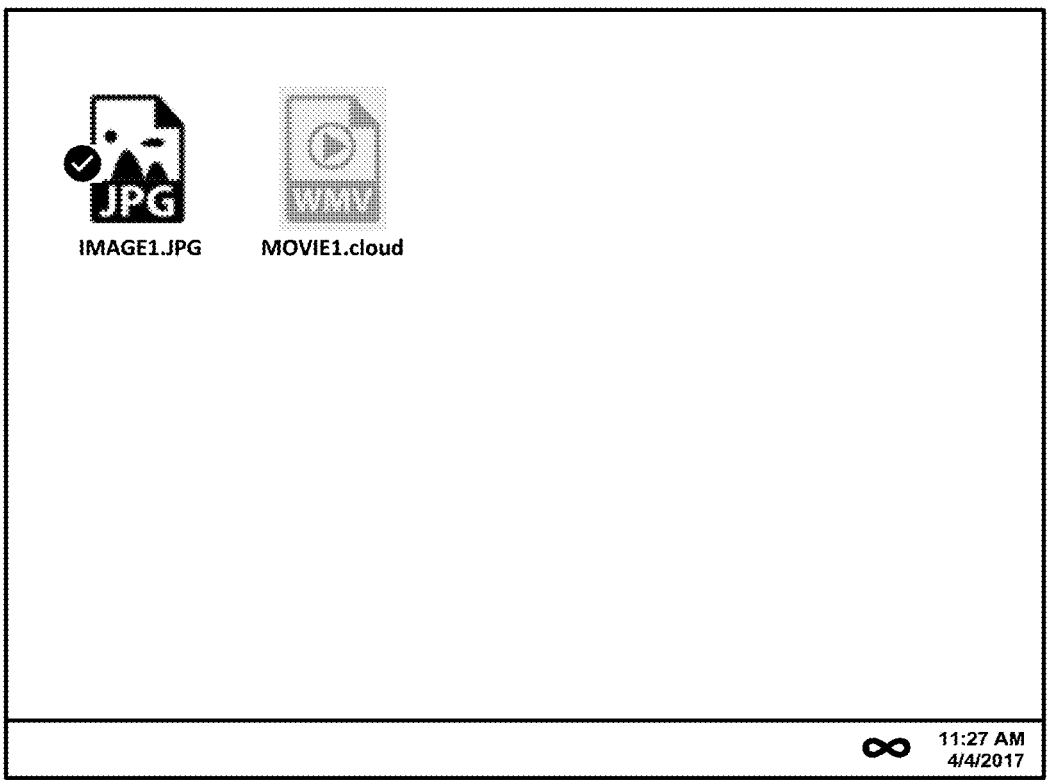

FIG. 9 illustrates a graphical user interface showing an unsynchronized data object, according to some embodiments. As shown in FIG. 9, in response to unsynchronizing the MOVIE1.WMV file, the icon representing the MOVIE1.WMV file on the graphical user interface is transformed into a file stub to indicate that the data object is no longer stored at the local computing device, but the metadata is still retained at the local computing device. In some embodiments, removal of a badge or checkmark, or changing the color of the icon (e.g., graying out the icon) can be used to indicate that the data object is unsynchronized. In some embodiments, a file extension (e.g., .cloud) can also be used to indicate that the data object is unsynchronized.

According to some embodiments, the local representative state and the remote representative state of a data object can be dynamically modified. This can be useful to adapt the data object to the environment of the local and/or remote computing device, or to adapt the storage requirements of the data object in response to changes to the content of the data object. For example, if content is added to a data object causing the size of the data object to exceed a service provider's file size limit, the remote representative state can be dynamically changed to a split file state. As another example, if confidential content is added to a data object, the local and remote representative states can be dynamically changed to encrypted states that are encrypted with different keys to increase the security protection of the data object.

Figure 10:
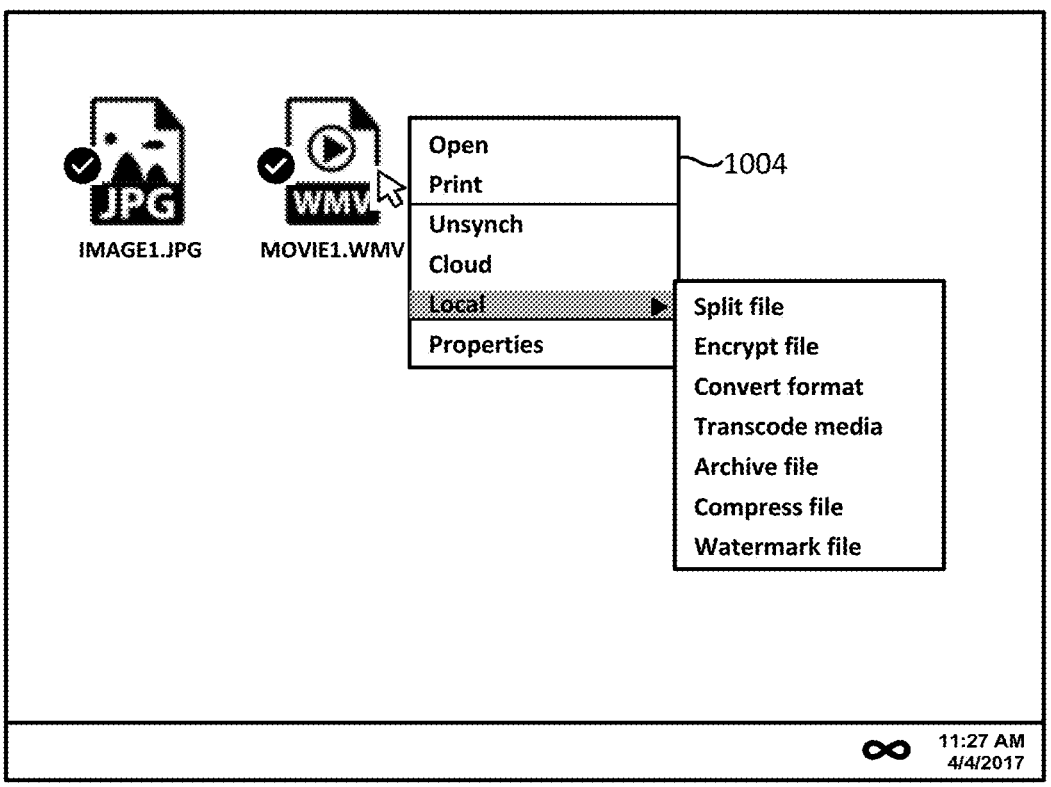

FIG. 10 illustrates a graphical user interface that allows dynamic modification of the representative states of a data object, according to some embodiments. In FIG. 10, the MOVIE1.WMV file is synchronized to a remote computing device as indicated by the checkmark. A user may select (e.g., right-click) the synchronized MOVIE1.WMV file to pull up a context menu 1004. Context menu 1004 may provide a "cloud" tab and a "local" tab that can be selected to pull-up a submenu with options to modify the respective representative states of the data object. As shown in FIG. 10, when the "local" tab is selected, a submenu listing the various state transformation types can be displayed. A user can then select the different options for the various state transformation types to change the local representative state of the MOVIE1.WMV file. A user can similarly select the "cloud" tab to change the remote representative state of the MOVIE1.WMV file at the remote computing device.

Figure 11:
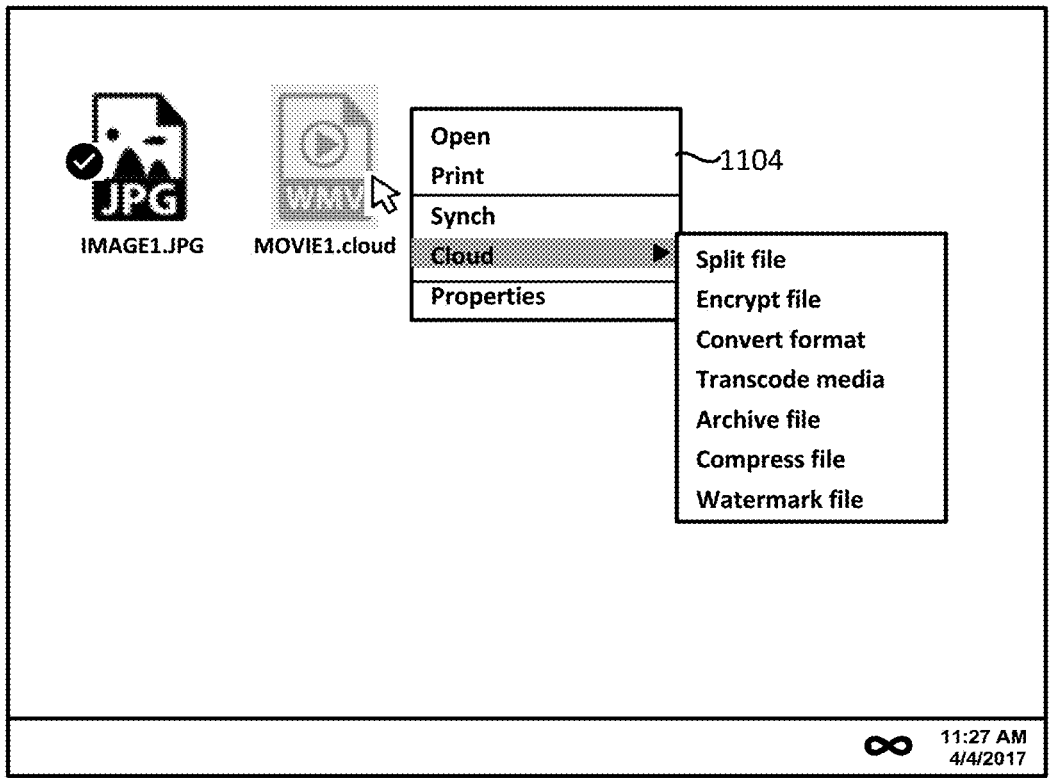

In some embodiments, the remote representative state of a remote data object can be modified without requiring the corresponding data object be present at the local computing device. In other words, the remote representative state of a remote data object can be modified when the data object is unsynchronized at the local computing device. FIG. 11 illustrates a graphical user interface that allows dynamic modification of the remote representative state when a data object is unsynchronized, according to some embodiments. In FIG. 11, the MOVIE1.WMV file is unsynchronized, and thus the MOVIE1.WMV file is not stored at the local computing device. A user may select (e.g., right-click) the file stub representing the MOVIE1.WMV file to pull up a context menu 1104. Context menu 1104 may provide a "cloud" tab that can be selected to pull-up a submenu with options to modify the remote representative state of the remote data object corresponding to the MOVIE1.WMV file. As shown in FIG. 11, when the "cloud" tab is selected, a submenu listing the various state transformation types can be displayed. A user can then select the different options for the various state transformation types to change the remote representative state of the MOVIE1.WMV file at the remote computing device. This can be done without requiring the MOVIE1.WMV file itself be present on the local computing device.

Figure 12:
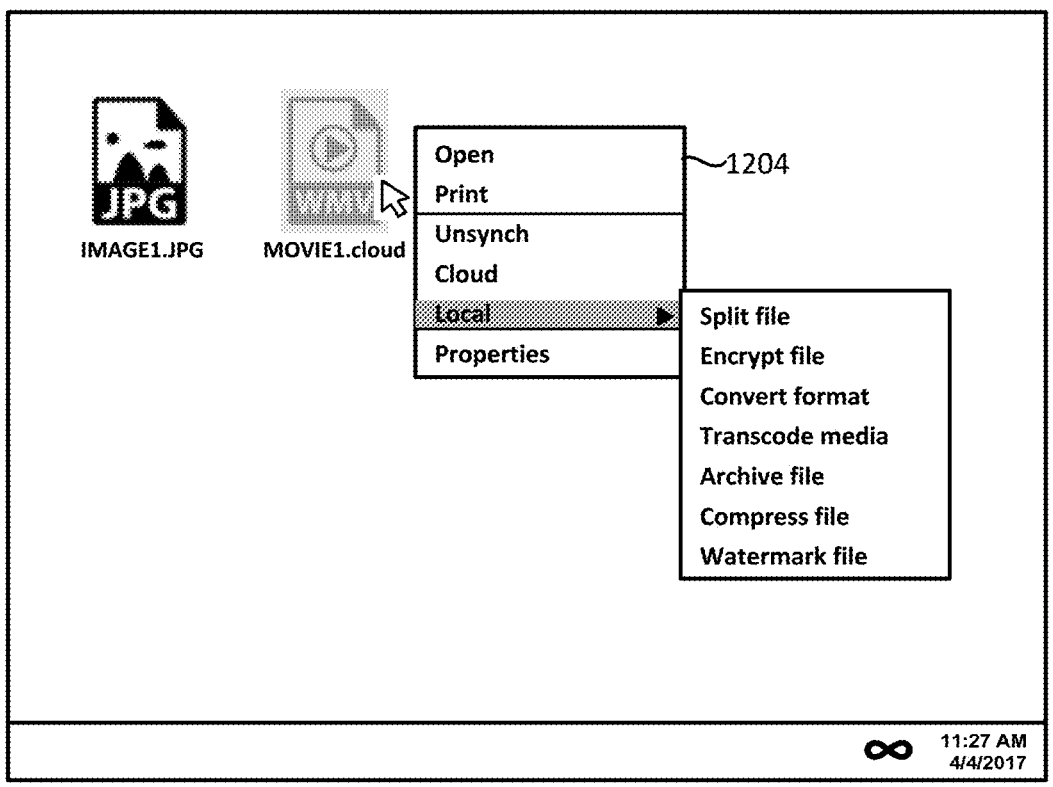

In some embodiments, the local representative state of a data object can also be modified without requiring the data object be present at the local computing device. In other words, the local representative state of the data object can be modified when the data object is unsynchronized at the local computing device. FIG. 12 illustrates a graphical user interface that allows dynamic modification of the local representative state when a data object is unsynchronized, according to some embodiments. In FIG. 12, the MOVIE1.WMV file is unsynchronized, and thus the MOVIE1.WMV file is not stored at the local computing device. A user may select (e.g., right-click) the file stub representing the MOVIE1.WMV file to pull up a context menu 1204. Context menu 1204 may provide a "local" tab that can be selected to pull-up a submenu with options to modify the local representative state of MOVIE1.WMV file. As shown in FIG. 12, when the "local" tab is selected, a submenu listing the various state transformation types can be displayed. A user can then select the different options for the various state transformation types to change the local representative state of the MOVIE1.WMV file at the local computing device. This can be done without requiring the MOVIE1.WMV file itself be present on the local computing device. However, because the data object is unsynchronized, the change to the local representative state of the data object may not take effect until the data object is synchronized to the local computing device. Thus, when the MOVIE1.WMV file is subsequently synchronized to the local computing device, the data object will be automatically transformed into the updated local representative state and stored on the local computing device in the updated local representative state.

Accordingly, various synchronization techniques have been described herein. By utilizing the techniques described herein, remote files in one format can be synchronized to local storage in a different format. Local files in one format can be synchronized to remote storage in a different format. Updates and additions to local or remote storage can be synchronized with disparate file formats. Remote of local file formats can be changed to different disparate formats without affecting synchronization. New state transformations that become available can be incorporated as plugins. Synchronization can be performed from one to many files and folders, and vice versa. The techniques described herein can advantageously provide users with the ability to consume a file in a more convenient format, allow metadata to be seamlessly added to remote or local storage, and/or allow security to be seamlessly added to remote or local storage.

Figure 13:
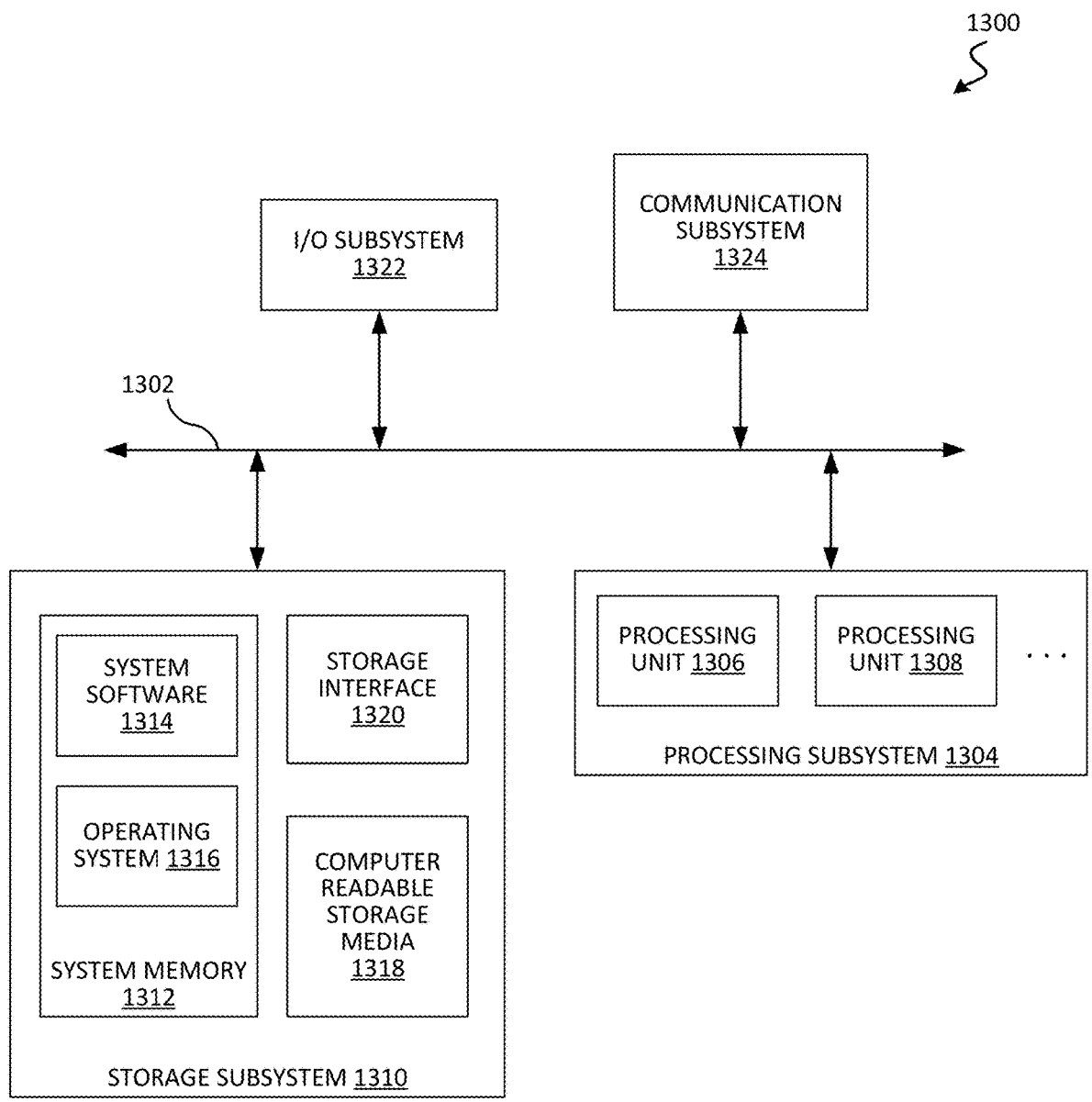
FIG. 13 illustrates a block diagram of a computing system 1300, according to some embodiments

FIG. 13 illustrates a block diagram of a computing system 1300, according to some embodiments. Computing system 1300 can be used to implement at least some of the computing devices described herein. Computing system 1300 can include a communications bus 1302 that provides connections to one or more subsystems, including a processing subsystem 1304, storage subsystem 1310, I/O subsystem 1322, and communication subsystem 1324. In some embodiments, processing subsystem 1308 can include one or more processing units 1306, 1308, etc. A processing unit can include one or more of a general purpose or specialized microprocessor, FPGA, DSP, or other processor. In some embodiments, a processing unit can be a single core or multicore processor.

In some embodiments, storage subsystem 1310 can include system memory 1312 which can include various forms of non-transitory computer readable storage media, including volatile (e.g., RAM, DRAM, cache memory, etc.) and non-volatile (flash memory, ROM, EEPROM, etc.) memory. Memory may be physical or virtual. System memory 1312 can include system software 1314 (e.g., BIOS, firmware, various software applications, etc.) and operating system data 1316. In some embodiments, storage subsystem 1310 can include non-transitory computer readable storage media 1318 (e.g., hard disk drives, floppy disks, optical media, magnetic media, and other media). A storage interface 1320 can allow other subsystems within computing system 1300 and other computing systems to store and/or access data from storage subsystem 1310.

In some embodiments, I/O subsystem 1322 can interface with various input/output devices, including displays (such as monitors, televisions, and other devices operable to display data), keyboards, mice, voice recognition devices, biometric devices, printers, plotters, and other input/output devices. I/O subsystem 1322 can include a variety of interfaces for communicating with I/O devices, including wireless connections (e.g., Wi-Fi, Bluetooth, Zigbee, and other wireless communication technologies) and physical connections (e.g., USB, SCSI, VGA, SVGA, HDMI, DVI, serial, parallel, and other physical ports).

In some embodiments, communication subsystem 1324 can include various communication interfaces including wireless connections (e.g., Wi-Fi, Bluetooth, Zigbee, and other wireless communication technologies) and physical connections (e.g., USB, SCSI, VGA, SVGA, HDMI, DVI, serial, parallel, and other physical ports). The communication interfaces can enable computing system 1300 to communicate with other computing systems and devices over local area networks, wide area networks, ad hoc networks, mesh networks, mobile data networks, the internet, and/or other communication networks.

It should be understood that the methods and processes described herein are exemplary in nature, and that the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It should also be understood that the components (e.g., functional blocks, modules, units, or other elements, etc.) of the devices, apparatuses, and systems described herein are exemplary in nature, and that the components in accordance with some embodiments may include one or more additional elements not specially described, omit one or more elements, combine one or more elements into a single element, split up one or more elements into multiple elements, and/or any combination thereof.

Although specific embodiments of the invention have been described, various modifications, alterations, alternative constructions, and equivalents are also encompassed within the scope of the invention. For example, one or more features from any embodiment may be combined with one or more features of any other embodiment. As another example, although some of the operations, configurations, and/or settings have been described as being applied at the data object level (e.g., operate independently on individual data objects), the operations, configurations, and/or settings can also be applied at a folder or directory level (e.g., operate on all data objects and subfolders within a folder or directory), or vice versa.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Further, while embodiments of the present invention have been described using a particular combination of hardware and software, it should be recognized that other combinations of hardware and software can also be used. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof.

A recitation of "a," "an," or "the" is intended to mean "one or more" unless specifically indicated to the contrary.

What is claimed is:

1. A computer-implemented method comprising:
storing a data object and metadata associated with the data object at a computing device, the data object being stored in a first representative state corresponding to a first format at the computing device;
displaying a set of potential representative states corresponding to different formats from which a second representative state is to be selected;
receiving a user selection of the second representative state from the set of potential representative states;
receiving user input to synchronize the data object into the second representative state at a remote computing device;
automatically transforming the data object from the first representative state into the second representative state;
synchronizing the data object to a remote data object stored at the remote computing device, the remote data object being stored in the second representative state at the remote computing device;
receiving an unsynchronization request to unsynchronize the data object at the computing device;
removing the data object from the computing device and freeing up memory space at the computing device;
maintaining the metadata associated with the data object at the computing device;
receiving a synchronization request to resynchronize the data object at the computing device;
retrieving the remote data object stored in the second representative state at the remote computing device; and
storing the data object back at the computing device in a representative state that is same or different as the first representative state.

2. The method of claim 1,
wherein the data object is stored back at the computing device in the first representative state.

3. The method of claim 1, wherein maintaining the metadata associated with the data object includes storing information indicating that the data object was previously stored in the first representative state at the computing device.

4. The method of claim 1, wherein maintaining the metadata associated with the data object includes storing information indicating that the remote data object corresponding to the data object is stored in the second representative state at the remote computing device.

5. The method of claim 1, wherein the data object is associated with a directory that includes other data objects, and the user selection of the second representative state is applied to the other data objects in the directory.

6. The method of claim 1, wherein the data object is associated with a directory that includes other data objects, and each data object in the directory is independently configurable as to which representative state to synchronize the corresponding data object into at the remote computing device.

7. The method of claim 1, wherein the set of potential representative states includes one or more of a split file state, a compressed state, an archived state, a converted format state, a watermarked state, an encrypted state, or a media transcoded state.

8. The method of claim 1, further comprising:
after removing the data object from the computing device:
receiving a synchronization request to synchronize the data object into a third representative state at the computing device;
retrieving the remote data object stored in the second representative state at the remote computing device;
transforming the remote data object from the second representative state into the third representative state; and
storing the transformed remote data object as the data object in the third representative state at the computing device.

9. The method of claim 8, further comprising:
displaying a set of potential representative states from which the third representative state is selected; and
receiving a user selection of the third representative state from the set of potential representative states.

10. The method of claim 1, wherein automatically transforming the data object from the first representative state into the second representative state includes at least one of:
splitting the data object into multiple smaller data objects;
joining the data object with other data objects into a larger data object;
compressing or decompressing the data object;
archiving the data object with other data objects into an archived data object;
converting the data object from the first format into a second format;
inserting or removing a watermark from the data object;
encrypting or decrypting the data object; or
transcoding the data object.

11. The method of claim 1, wherein automatically transforming the data object from the first representative state into the second representative state includes performing a combination of two or more of:
splitting the data object into multiple smaller data objects;
joining the data object with other data objects into a larger data object;
compressing or decompressing the data object;
archiving the data object with other data objects into an archived data object;
converting the data object from the first format into a second format;
inserting or removing a watermark from the data object;
encrypting or decrypting the data object; or
transcoding the data object.

12. A computing device comprising:
a processor;
and a memory storing executable code, which when executed by the processor, implements operations including:
storing a data object and metadata corresponding to the data object at the computing device, the data object being stored in a first representative state corresponding to a first format at the computing device;
displaying a set of potential representative states corresponding to different formats from which a second representative state is to be selected;
receiving a user selection of the second representative state from the set of potential representative states;
receiving user input to synchronize the data object into the second representative state at a remote computing device;
automatically transforming the data object from the first representative state into the second representative state;
synchronizing the data object to a remote data object stored at the remote computing device, the remote data object being stored in the second representative state at the remote computing device;
receiving an unsynchronization request to unsynchronize the data object at the computing device;
removing the data object from the computing device and freeing up memory space at the computing device;
maintaining the metadata corresponding to the data object at the computing device;
receiving a synchronization request to resynchronize the data object at the computing device;
retrieving the remote data object stored in the second representative state at the remote computing device; and
storing the data object back at the computing device in a representative state that is same or different as the first representative state.

13. The computing device of claim 12, wherein the data object is stored back at the computing device in the first representative state.

14. The computing device of claim 12, wherein maintaining the metadata corresponding to the data object includes storing information indicating that the data object was previously stored in the first representative state at the computing device.

15. The computing device of claim 12, wherein maintaining the metadata corresponding to the data object includes storing information indicating that the remote data object corresponding to the data object is stored in the second representative state at the remote computing device.

16. The computing device of claim 12, wherein the data object is stored in a directory at the computing device with other data objects, and the user selection of the second representative state is applied to the other data objects in the directory.

17. The computing device of claim 12, wherein the data object is stored in a directory at the computing device with other data objects, and each data object in the directory is independently configurable as to which representative state to synchronize the corresponding data object into at the remote computing device.

18. The computing device of claim 12, wherein the set of potential representative states includes one or more of a split file state, a compressed state, an archived state, a converted format state, a watermarked state, an encrypted state, or a media transcoded state.

19. The computing device of claim 12, wherein the operations further include:

after removing the data object from the computing device:

receiving a synchronization request to synchronize the data object in a third representative state at the computing device;

retrieving the remote data object stored in the second representative state at the remote computing device;

transforming the remote data object from the second representative state into the third representative state; and storing the transformed remote data object as the data object in the third representative state at the computing device.

20. The computing device of claim 19, wherein the operations further include:

displaying a set of potential representative states from which the third representative state is selected; and receiving a user selection of the third representative state from the set of potential representative states.

21. The computing device of claim 12, wherein automatically transforming the data object from the first representative state into the second representative state includes at least one of:

splitting the data object into multiple smaller data objects;

joining the data object with other data objects into a larger data object;

compressing or decompressing the data object;

archiving the data object with other data objects into an archived data object;

converting the data object from the first format into a second format;

inserting or removing a watermark from the data object;

encrypting or decrypting the data object; or transcoding the data object.

22. The computing device of claim 12, wherein automatically transforming the data object from the first representative state into the second representative state includes performing a combination of two or more of:

splitting the data object into multiple smaller data objects;

joining the data object with other data objects into a larger data object;

compressing or decompressing the data object;

archiving the data object with other data objects into an archived data object;

converting the data object from the first format into a second format;

inserting or removing a watermark from the data object;

encrypting or decrypting the data object; or transcoding the data object.

\* \* \* \* \*